W. T. Munger,
Knob Attachment,
No. 48,874. Patented July 18, 1865.

Witnesses:
Mary A. Hine.
Rufus H. Sanford.

Inventor:
Wallace T. Munger.
By his Atty
John E. Earle.

AM. PHOTO-LITHO. CO. N.Y. (OSBORNE'S PROCESS.)

UNITED STATES PATENT OFFICE.

W. T. MUNGER, OF BRANFORD, ASSIGNOR TO HIMSELF AND JAS. GRAHAM, OF NEW HAVEN, CONNECTICUT.

IMPROVED EXTENSION DOOR-KNOBS.

Specification forming part of Letters Patent No. 48,874, dated July 18, 1865.

*To all whom it may concern:*

Be it known that I, W. T. MUNGER, of Branford, in the county of New Haven and State of Connecticut, have invented a new and Improved Mode of Securing Door-Knobs to their Spindles; and I do hereby declare the following, when taken in connection with the accompanying drawings and the letters of reference marked thereon, to be a full, clear, and exact description of the same, and which said drawings constitute part of this specification, and represent, in—

Figure 1:
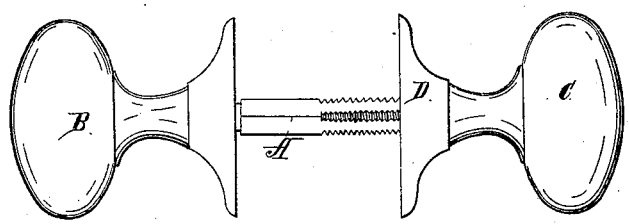
Figure 2:
Figure 4:
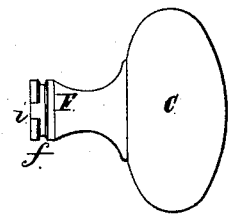
Figure 3:
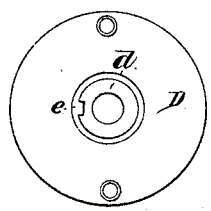
Figure 5:
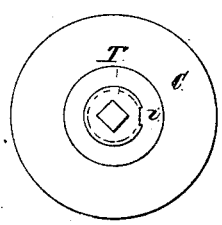

Figure 1, a side view of a pair of knobs and spindles; Figs. 2 and 3, the construction of the rose; Figs. 4 and 5, the construction of the shank and knob, and in Figs. 6, 7, and 8 an equivalent construction of the rose.

My invention consists in an improvement in securing door-knobs to their spindles, so that the distance between the two knobs may be adjusted to the thickness of the door without the use of washers between the knobs and rose or screw to secure the knob to the spindle, as in common use.

To enable others skilled in the art to construct and use my improvement, I will proceed to fully describe the same, as illustrated in the accompanying drawings.

A is the spindle, secured to one of the knobs, B, in the usual manner. C is the adjustable knob; D, the rose.

On the end of the spindle to which the adjustable knob is to be attached I cut an ordinary screw-thread, cutting only the corners, pressing the square form to fit the hole in the shank, as seen in Fig. 1. The rose D, I construct as seen in Fig. 2, with a nut attached to it to screw onto the spindle.

The socket $d$ is formed to receive the knob C. The shank F of the said knob C, as seen in Fig. 4, is formed so as to enter and fill the socket $d$ of the rose D. A lip or projection, $e$, is formed in the socket $d$, as seen in Figs. 2 and 3. A groove, $f$, is formed around the shank F, and a notch, $i$, opening into the said groove, as seen in Figs. 4 and 5. The shank of the knob C inserted into the socket $d$, so that the projection $e$ will pass through the notch $i$, then turned partially around, the lip $e$ will pass into the groove $f$ and secure the knob to the rose. When the spindle A (the knob B secured to it in the usual manner) is passed through the door and latch, the rose D is turned onto the spindle until it arrives at its place against the door. The knob C is then placed on over the spindle in the usual manner, the shank entering the socket of the rose, and the lip turned into the groove, as before described, the rose then secured to the door by screws or otherwise in the usual manner. The knob cannot be removed from the spindle, the latch preventing its being turned sufficiently to be released from the lip $e$, and thus the two knobs are secured together and adjusted to the thickness of the door without the use of washers or screw through knob and spindle.

Figure 6:
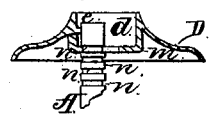
Figure 7:
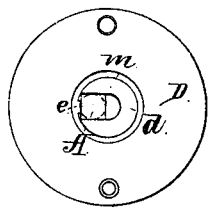
Figure 8:
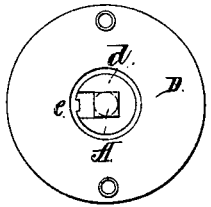

Instead of cutting the thread upon the spindle, as described, parallel grooves $n$ may be cut around the spindle, as seen in Fig. 6; and instead of the nut in the rose, as described, a plate, $m$, corresponding in thickness to the width of the grooves in the shank, attached to or made a part of the rose, as seen in Fig. 7. The hole through the plate $m$, elongated and made semicircular, as seen in Fig. 7, permits the spindle A to be inserted, as seen in Fig. 7, then the rose set into the groove, as seen in Fig. 8, which will secure the rose to the spindle, the knob to be attached as before described.

I prefer the first method described, as the adjustment may be unlimited, while by the last described it is qualified by the distance between the grooves on the spindle.

Having therefore thus fully described my invention, what I claim as new and useful, and wish to secure by Letters Patent, is—

The combination of the grooved shank F with a lip, $e$, or its equivalent, in the socket of the rose, in the manner and for the purpose described.

W. T. MUNGER.

Witnesses:
JOHN E. EARLE,
MARY A. HINE.